United States Patent
Li

(10) Patent No.: US 8,143,863 B2
(45) Date of Patent: Mar. 27, 2012

(54) CIRCUITS AND METHODS FOR CONTROLLING A CURRENT FLOWING THROUGH A BATTERY

(75) Inventor: Guoxing Li, Sunnyvale, CA (US)

(73) Assignee: O2Micro, Inc, Santa Clara, CA (US)

( * ) Notice: Subject to any disclaimer, the term of this patent is extended or adjusted under 35 U.S.C. 154(b) by 99 days.

(21) Appl. No.: 12/577,633

(22) Filed: Oct. 12, 2009

(65) Prior Publication Data

US 2011/0084667 A1    Apr. 14, 2011

(51) Int. Cl.
*H02J 7/04* (2006.01)
*H02J 7/00* (2006.01)

(52) U.S. Cl. ........ 320/145; 320/148; 320/141; 320/150; 320/155; 320/166

(58) Field of Classification Search ............... 320/145, 320/148, 150, 155, 166, 141
See application file for complete search history.

(56) References Cited

U.S. PATENT DOCUMENTS

| | | | | |
|---|---|---|---|---|
| 4,290,002 A | * | 9/1981 | Piotti | 320/145 |
| 4,755,733 A | * | 7/1988 | Laliberte | 320/125 |
| 4,767,977 A | * | 8/1988 | Fasen et al. | 320/148 |
| 5,510,690 A | * | 4/1996 | Tanaka et al. | 320/106 |
| 5,541,491 A | * | 7/1996 | Yamazaki et al. | 320/145 |
| 5,698,963 A | * | 12/1997 | Seong et al. | 320/145 |
| 5,764,027 A | * | 6/1998 | Harvey | 320/125 |
| 5,929,602 A | * | 7/1999 | Suzuki | 320/116 |
| 6,064,178 A | * | 5/2000 | Miller | 320/117 |
| 6,771,042 B2 | * | 8/2004 | Chen et al. | 320/110 |

\* cited by examiner

*Primary Examiner* — Patrick Assouad
*Assistant Examiner* — Steve T Chung

(57) ABSTRACT

A circuit for controlling a current flowing through a battery includes a driver and a filter coupled to the driver. The driver can generate a pulse signal in a first operating mode and generate a first signal in a second operating mode to control the current through the battery. The filter can filter the pulse signal to provide a filtered DC signal to adjust an on-resistance of a switch in series with the battery based on a duty cycle of the pulse signal in the first operating mode. The filter can receive the first signal and provide a second signal to drive the switch in a linear region in the second operating mode.

20 Claims, 8 Drawing Sheets

CIRCUITS AND METHODS FOR CONTROLLING A CURRENT FLOWING THROUGH A BATTERY

BACKGROUND

Currently, batteries, for example, Lithium-Ion batteries, are widely used to provide power supply to a variety of electronic devices or systems, such as notebook computers, electric vehicles (EVs), hybrid electric vehicles (HEVs), and power tools. A circuit is typically used to control charging and/or discharging of a battery pack.

FIG. 1 shows a conventional circuit 100 for controlling charging and discharging of a battery pack. The battery pack includes a battery 110 and terminals PACK+ and PACK−. The circuit 100 includes a discharge metal-oxide-semiconductor field-effect transistor (MOSFET) 142, a charge MOSFET 122, a trickle discharge MOSFET 144, a trickle charge MOSFET 124, a resistor 184, a resistor 186, and a protection circuit (e.g., a protection integrated circuit (IC)) 160.

During charging, a charger is coupled to the terminals PACK+ and PACK− to charge the battery 110. In a normal charging mode, the charge MOSFET 122 controls a charging current. In a trickle charging mode, e.g., when the battery 100 is over drained, the trickle charge MOSFET 124 is fully on to allow a relatively small charging current to charge the battery 100 to prevent the battery pack from being damaged. The resistor 186 is used to limit the level of the charging current in the trickle charging mode. Typically, the charging current in the trickle charging mode is called a trickle charging current.

During discharging, the battery 110 is discharged to power a load coupled to the terminals PACK+ and PACK−. The discharge MOSFET 142 controls a discharging current in a normal discharging mode. In a trickle discharging mode, e.g., to avoid inrush current to the load or to detect the load condition when an open circuit or short circuit condition occurs to the load, the trickle discharge MOSFET 144 is fully on to allow a relatively small discharging current to flow to the load. The resistor 184 is used to limit the discharging current in the trickle discharging mode. Typically, the discharging current in the trickle discharging mode is called a trickle discharging current.

Since at least four MOSFETs are used, the circuit 100 may have a relatively high cost. Moreover, each of the MOSFETs 122, 124, 142 and 144 is driven separately by an individual driver in the driver block 162. In other words, the driver block 162 has to include several drivers and the protection IC 160 (which the driver block 162 is assembled into) may have a large pin count to drive the MOSFETs, which increases the cost of the protection IC 160. Furthermore, the voltage across the battery 110 increases as the trickle charging proceeds and thus the voltage across the resistor 186 drops. Therefore, the trickle charging current decreases, which results in a longer charging process.

SUMMARY

In one embodiment, a circuit for controlling a current flowing through a battery includes a driver and a filter coupled to the driver. The driver can generate a pulse signal in a first operating mode and generate a first signal in a second operating mode to control the current through the battery. The filter can filter the pulse signal to provide a filtered DC signal to adjust an on-resistance of a switch in series with the battery based on a duty cycle of the pulse signal in the first operating mode. The filter can receive the first signal and provide a second signal to drive the switch in a linear region in the second operating mode.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments in accordance with the present invention provide circuits for controlling a current, e.g., a charging current or a discharging current, flowing through a battery. In one embodiment, a driver in a circuit can generate a drive signal to control a switch, e.g., a charge switch or a discharge switch, coupled in series with the battery. The circuit can selectively operate in a first operating mode (e.g., a trickle charging mode or a trickle discharging mode) or a second operating mode (e.g., a normal charging mode or a normal discharging mode) to charge or discharge a battery. In the first operating mode, the drive signal can include a pulse signal, e.g., a pulse width modulation (PWM) signal. A filter can filter the PWM signal and provide a filtered DC signal having a substantially constant level to adjust an on-resistance of the switch. A current (e.g., a trickle charging current or a trickle discharging current) through the battery in the first operating mode is determined by a duty cycle of the PWM signal. Advantageously, the trickle charging and normal charging can be controlled via the same charge switch, and the trickle discharging and normal discharging can be controlled via the same discharge switch. Thus, the cost of the circuit can be reduced.

Figure 1:
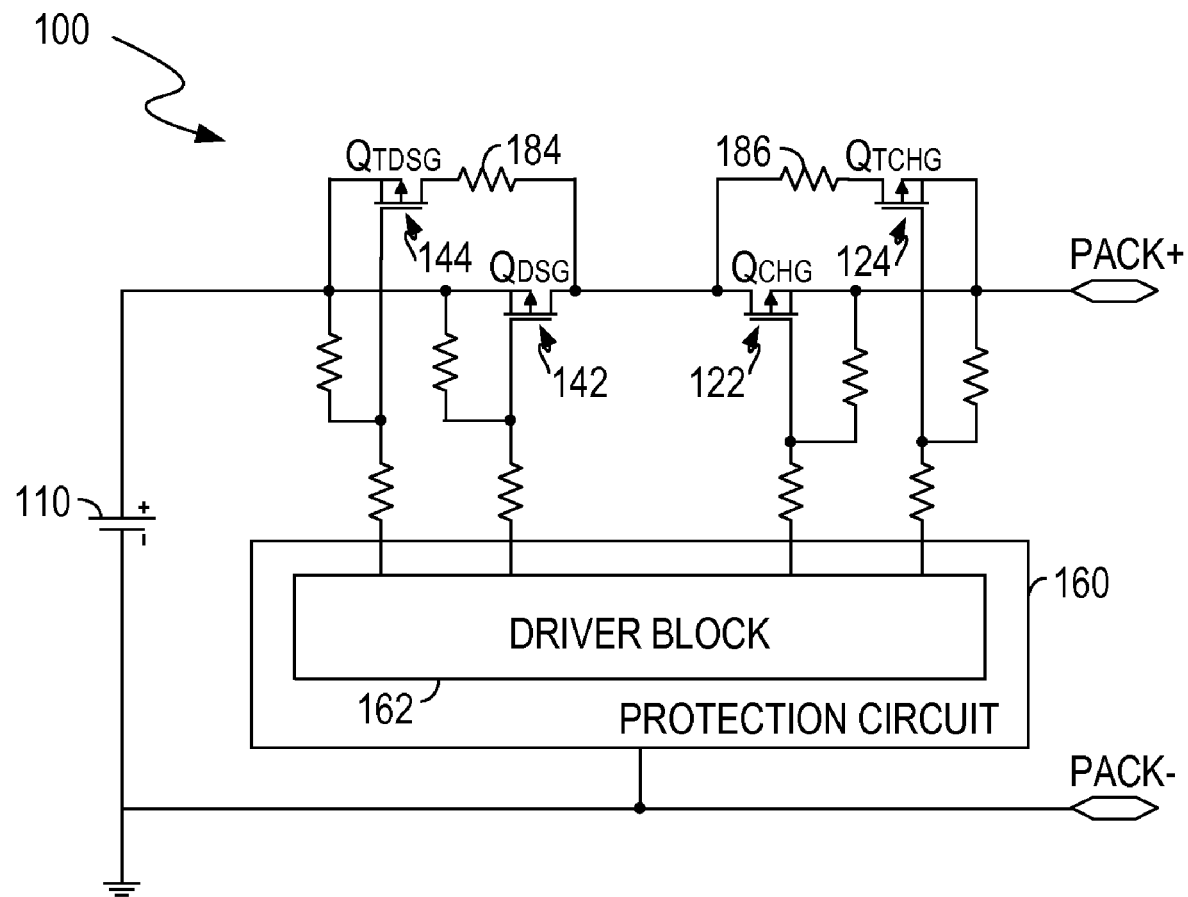
FIG. 1 shows a conventional circuit for controlling charging and discharging of a battery pack.
Figure 2:
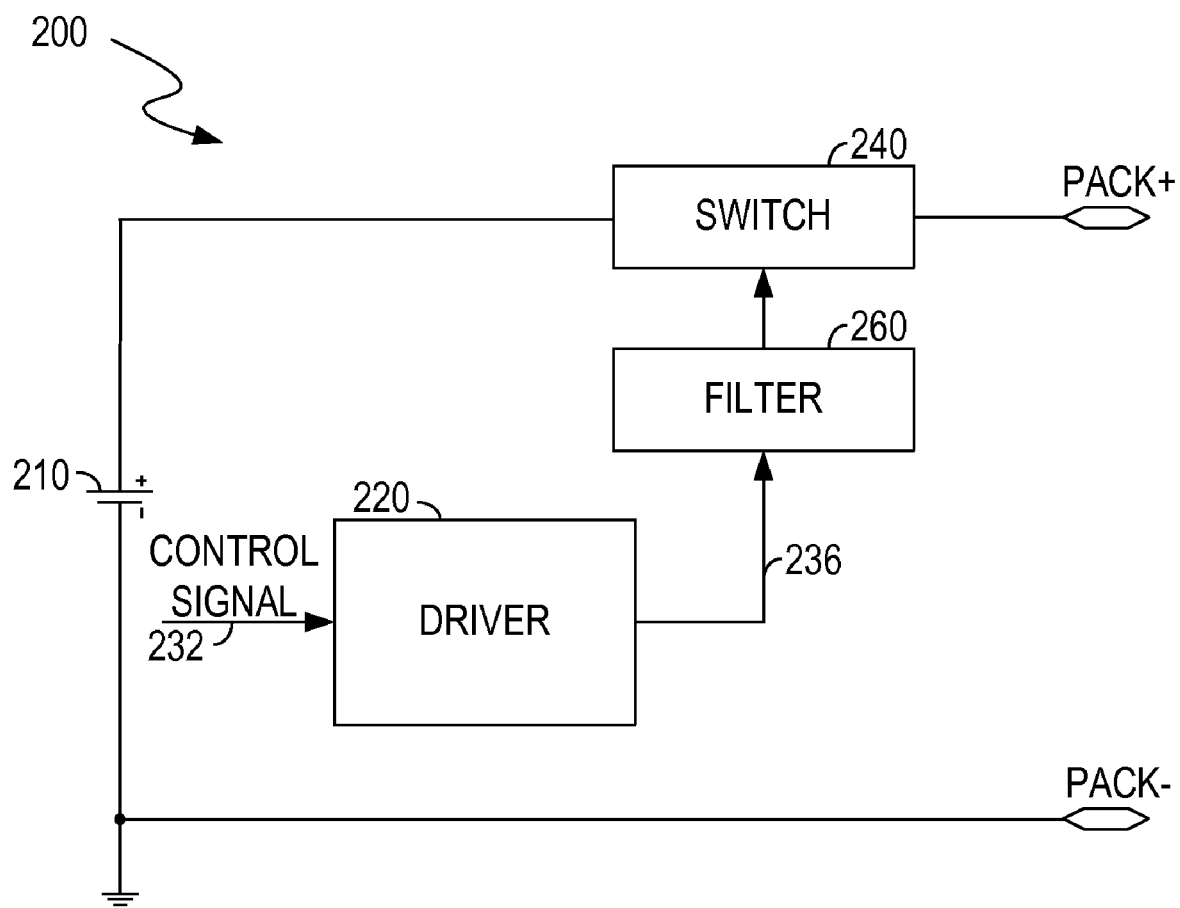
FIG. 2 shows a block diagram for controlling a current flowing through a battery according to one embodiment of the present invention.

FIG. 2 shows a block diagram of a circuit 200 for controlling a current flowing through a battery according to one embodiment of the present invention. In the embodiment of FIG. 2, the circuit 200 includes a switch (e.g., a MOSFET) 240, a driver 220, and a filter 260. A battery pack includes a battery 210 and terminals PACK+ and PACK−. Although one battery cell is shown in FIG. 2, the battery 210 can include multiple battery cells. The switch 240 is coupled to the battery 210 in series and controls a current (e.g., a charging current or a discharging current) flowing to the battery 210. In one embodiment, the circuit 200 can be assembled into the battery pack.

The driver 220 can control the switch 240 via the filter 260, thereby controlling the current flowing through the battery 210. In operation, a control signal 232 is input into the driver 220. The driver 220 can generate a drive signal 236 based on the control signal 232. The operation of the battery 210 can be switched between at least a first operating mode (e.g., a trickle charging mode or a trickle discharging mode) and a second operating mode (e.g., a normal charging mode or a normal discharging mode) based on the drive signal 236, in one embodiment. In the first operating mode, the drive signal 236 can be a pulse signal, e.g., a PWM (pulse width modulation) signal. The filter 260 filters the pulse signal and generates a filtered DC signal to control the switch 240. The filtered DC signal can be substantially constant. As used herein, "substantially constant" means that the signal may be slightly different from constant due to the unideality of the electronic components but within a range such that the switch driven by the signal has a relatively stable on-resistance. More specifically, the filtered DC signal adjusts an on-resistance of the switch 240 based on a duty cycle of the pulse signal in the first operating mode. Thus, the switch 240 operates in the saturation region. In the second operating mode, the drive signal 236 can be a first DC signal (e.g., logic 1), in one embodiment. The filter 260 receives the first DC signal and provides a second DC signal to drive the switch 240. More specifically, the second DC signal controls the switch 240 in a linear region, e.g., switch 240 is fully on. Thus, a current flowing through the battery 210 in the first operating mode is less than a current flowing through the battery 210 in the second operating mode. Alternatively, in the second operating mode, the drive signal 236 can be a pulse signal, e.g., a PWM signal. In one embodiment, the drive signal 236 which is the PWM signal can directly control the switch 240 in the linear region without going through the filter 260.

In one embodiment, the first mode can be a trickle charging mode and the second mode can be a normal charging mode. Thus, by controlling the switch 240 (charge switch), the battery 210 can be charged by a trickle charging current or a normal charging current. The trickle charging current is adjusted according to a duty cycle of the drive signal 236. In another embodiment, the first mode can be a trickle discharging mode and the second mode can be a normal discharging mode. Thus, by controlling the switch 240 (discharge switch), the battery 210 can be discharged by a trickle discharging current or a normal discharging current. The trickle discharging current is adjusted according to a duty cycle of the drive signal 236.

Advantageously, the same charge switch can be used in both normal charging and trickle charging. Similarly, the same discharge switch can be used in both normal discharging and trickle discharging. The reduced number of switches can lead to a reduced number of drivers and a reduced pin count of a protection IC in which the driver 220 is assembled. As a result, the cost of the circuit 200 is reduced. Furthermore, the trickle charging/discharging current can be adjusted to help achieve safe usage of the battery pack in various applications.

Figure 3:
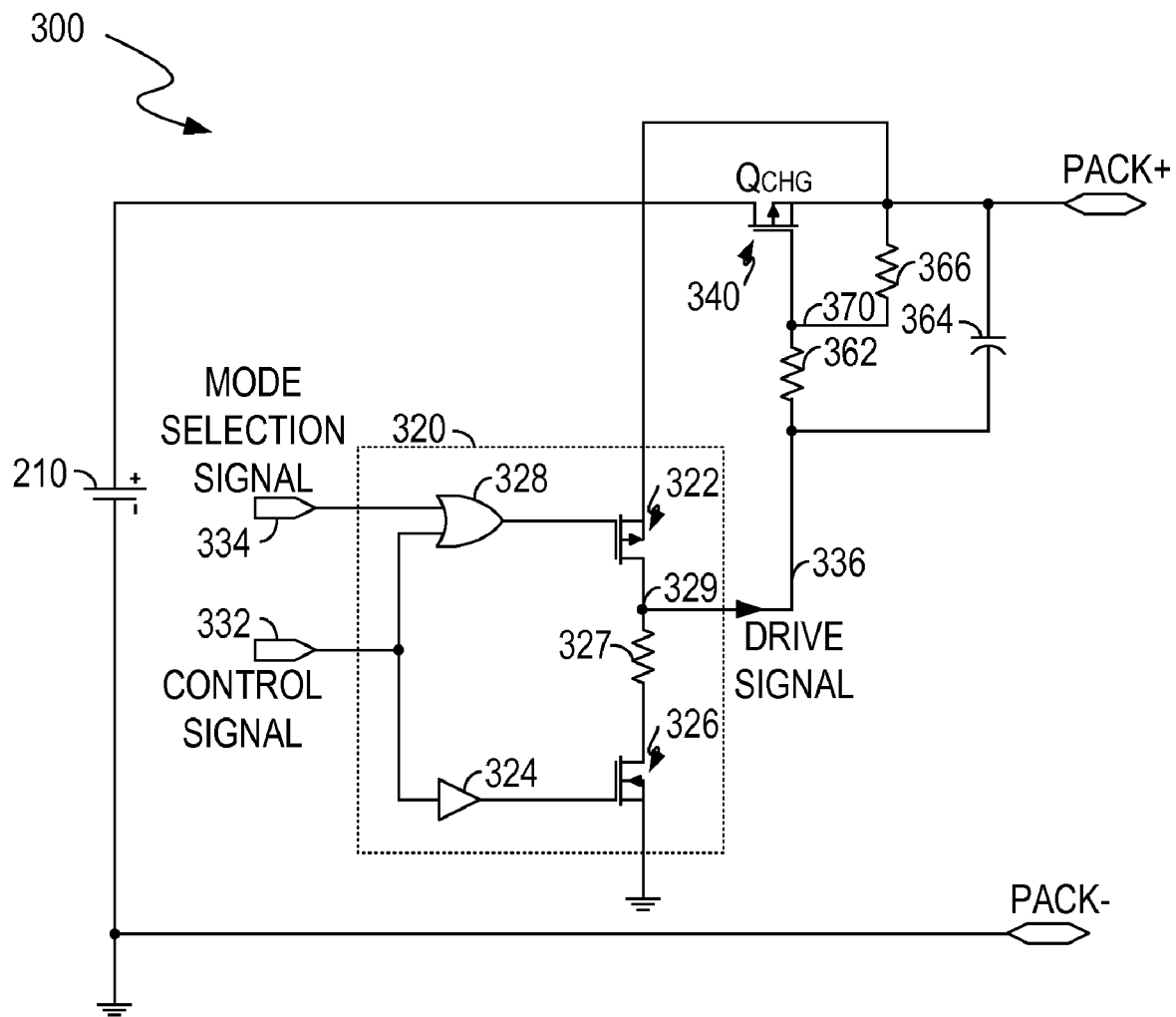
FIG. 3 shows a schematic diagram for controlling charging of a battery according to one embodiment of the present invention.

FIG. 3 shows a schematic diagram of a circuit 300 for controlling charging of a battery according to one embodiment of the present invention. In the example of FIG. 3, the circuit 300 includes a charge switch 340, a driver 320, and a filter. The charge switch 340 can be constructed of a PMOSFET. The drain and source of the PMOSFET 340 are coupled to the positive terminal of the battery 210 and the terminal PACK+, respectively. The gate of the PMOSFET 340 is coupled to the driver 320.

The driver 320 can receive a mode selection signal 334 and a control signal 332 and generate a drive signal 336. The mode selection signal 334 can select a mode between a normal charging mode and a trickle charging mode. In the normal charging mode, the control signal 332 can be a substantially constant DC signal (e.g., logic 1). However, the invention is not so limited; in the normal charging mode, the control signal 332 can also be a pulse signal (e.g., a PWM signal). In the trickle charging mode, the control signal 332 can be a PWM signal having an adjustable duty cycle. The filter (e.g., including resistors 327, 362, 366, a capacitor 364, and a gate capacitance of the charge switch 340) receives the drive signal 336 from the driver 320 and provides a smoothed DC signal to control the charge switch 340. The charge switch 340 operates in the linear region and saturation region in the normal charging mode and the trickle charging mode respectively.

In the example of FIG. 3, the driver 320 includes an OR gate 328, a buffer 324, a PMOSFET 322, an NMOSFET 326, and a resistor 327. The control signal 332 is input into the buffer 324 and the OR gate 328. The mode selection signal 334 is input into the OR gate 328. The drive signal 336 is generated by the driver 320 and output to the filter.

The filter can include a first order filter and a second order filter. In the example of FIG. 3, the first order filter is formed by the resistors 327, 362 and 366, and the capacitor 364. The second order filter is formed by the resistors 327, 362 and 366, and the gate capacitance of the charge switch 340. The resistor 366 is coupled between the gate and the source of the charge switch 340. Therefore, a voltage drop across the resistor 366 can control the gate-source voltage $V_{gs}$ of the charge switch 340. In one embodiment, the voltage drop across the resistor 366 is equal to the gate-source voltage $V_{gs}$ of the charge switch 340.

In the trickle charging mode, the mode selection signal 334 is set to a substantially constant DC voltage, e.g., logic 1 (high level), and the control signal 332 is a PWM signal, in one embodiment. In this instance, the output of the OR gate 328 is logic 1 (high level) so as to turn off the PMOSFET 322. The control signal 332, which is the PWM signal, passes through the buffer 324 to drive the NMOSFET 326. As such, a node 329 outputs the drive signal 336 in a form of a square wave. In other words, the node 329 also outputs a PWM signal. Furthermore, a duty cycle of the drive signal 336, which is a PWM signal, is determined by a duty cycle of the control signal 332.

The filter smoothes the square wave of the drive signal 336 and generates a smoothed DC voltage with reduced ripple. In one embodiment, the filter including the first order filter and the second order filter smoothes the drive signal 336 which is a PWM signal to generate a substantially constant DC voltage signal 370. In one embodiment, the DC voltage signal 370 is the voltage drop across the resistor 366, which can control the gate-source voltage $V_{gs}$ of the charge switch 340.

In one embodiment, the DC voltage signal 370 drives the charge switch 340 to operate in a saturation region, where a current flowing through the charge switch 340 is determined by the voltage $V_{gs}$ of the charge switch 340. In other words, the on-resistance of the charge switch 340 can be adjusted by regulating the DC voltage signal 370 across the resistor 366, which has a voltage equal to the gate-source voltage $V_{gs}$ of the charge switch 340. The DC voltage signal 370 is determined by the duty cycle of the drive signal 336, which is further determined by the duty cycle of the control signal 332, in one embodiment. As such, in the trickle charging mode, the trickle charging current flowing through the charge switch 340 is determined by the duty cycle of the control signal 332.

The voltage across the battery 210 increases as the trickle charging proceeds. When the voltage across the battery 210 reaches a predetermined value, the charging of the battery 210 can be switched to the normal charging mode. In the normal charging mode, the control signal 332 is set to a substantially constant DC voltage, e.g., logic 1 (high level), and the mode selection signal 334 is set to a substantially constant DC voltage, e.g., logic 0 (low level), in one embodiment. In this instance, the output of the OR gate 328 is logic 1 (high level) so as to turn off the PMOSFET 322. The control signal 332, which is logic 1, passes through the buffer 324 to turn on the NMOSFET 326. As such, a voltage of the DC voltage signal 370, which is equal to the gate-source voltage $V_{gs}$ of the charge switch 340 can be given by equation (1) as follows:

$$V_{370}=V_{gs}=V_{PACK+}*R_1/(R_1+R_2+R_3) \quad (1)$$

where $V_{370}$ is the voltage of the DC voltage signal 370, $V_{PACK+}$ is the voltage at the terminal PACK+, and $R_1$, $R_2$ and $R_3$ are the resistances of the resistors 366, 362 and 327, respectively. In one embodiment, the DC voltage signal 370 drives the charge switch 340 to operate in the linear region (e.g., fully on).

In another embodiment, the control signal 332 is a PWM signal, and the mode selection signal 334 is set to a substantially constant DC voltage, e.g., logic 1 (high level) in the normal charging mode. In this instance, the output of the OR gate 328 is logic 1 (high level) so as to turn off the PMOSFET 322. The control signal 332, which is the PWM signal, passes through the buffer 324 to drive the NMOSFET 326. As such, a node 329 outputs the drive signal 336, e.g., a PWM signal. In one embodiment, in the normal charging mode, the drive signal 336 can directly control the charge switch 340 in the linear region (e.g., fully on) without going through the resistor 362 and the capacitor 364.

In one embodiment, to terminate charging of the battery 210, the control signal 332 is set to logic 0 (low level), and the mode selection signal 334 is set to logic 0 (low level). In this instance, the output of the OR gate 328 is logic 0 (low level) so as to turn on the PMOSFET 322. Thus, the turn-on resistance of the PMOSFET 322, which is relatively small, is coupled in parallel with the resistors 362 and 366. As such, an RC time constant of the circuit that includes the PMOSFET 322, the resistors 362 and 366, and the capacitor 364 is relatively small. As a result, the gate-source voltage that drives the charge switch 340 can decrease to a certain value to turn off the charge switch 340 relatively fast.

In one embodiment, the resistances of the resistors 362 and 366, and the capacitance of the capacitor 364 can be adjusted according to the gate capacitance of the charge switch 340 and the frequency of the PWM signal to further reduce the ripple of the DC voltage signal 370.

Advantageously, the normal charging and the trickle charging of the battery 210 are controlled by the same charge switch 340 according to the control signal 332. A single driver 320 is used to control the charge switch 340. As such, the die area and cost of the circuit 300 can be reduced. Furthermore, the discharging of a battery pack can be controlled by adopting similar structures as described with regard to FIG. 3, thereby reducing the cost of a circuit for controlling battery discharging.

Figure 4:
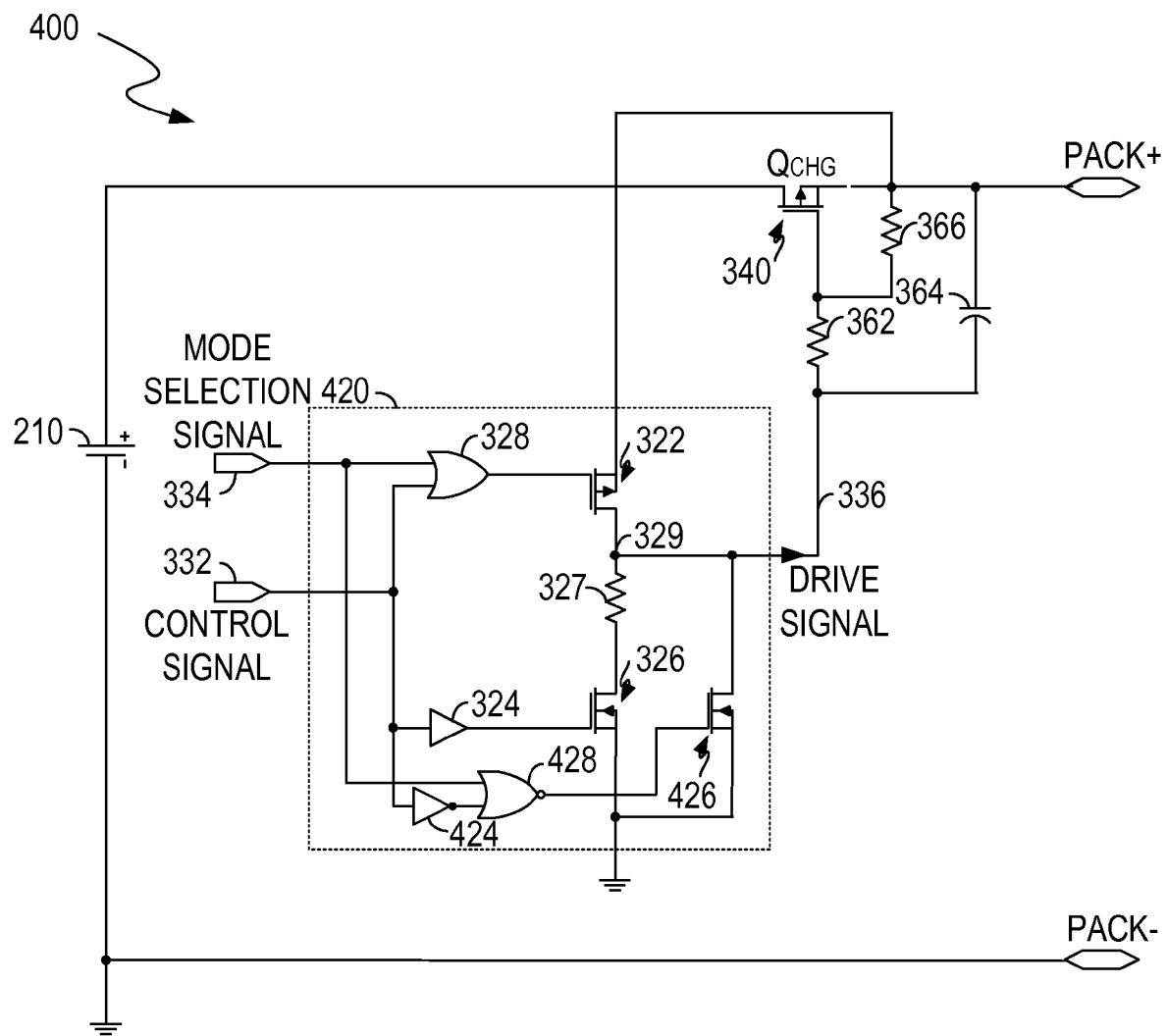
FIG. 4 shows a schematic diagram for controlling charging of a battery according to another embodiment of the present invention.

FIG. 4 shows a circuit 400 for controlling charging of a battery according to another embodiment of the present invention. Elements labeled the same as in FIG. 3 have similar functions. In the example of FIG. 4, the charging circuit 400 includes a charge switch 340, a driver 420, and a filter.

In the example of FIG. 4, the driver 420 includes an OR gate 328, a gate 324, a PMOSFET 322, an NMOSFET 326, a resistor 327, an inverter gate 424, a NOR gate 428, and an NMOSFET 426. The control signal 332 is input into the OR gate 328, the gate 324, and the inverter gate 424. The mode selection signal 334 is input into the OR gate 328 and the NOR gate 428. The inverter gate 424 outputs a signal to the NOR gate 428. The drain and source of the NMOSFET 426 are coupled to the node 329 and the source of the NMOSFET 326, respectively. The gate of the NMOSFET 426 is coupled to the inverter gate 428.

The operation of the trickle charging is similar to the example in FIG. 3 and will not be detailed described herein. Advantageously, in the normal charging mode, the charge switch 340 is turned on relatively fast, by using the inverter gate 424, the NOR gate 428, and the NMOSFET 426, in one embodiment. In the normal charging mode, the control signal 332 is set to a substantially constant voltage, e.g., logic 1 (high level), and the mode selection signal 334 is set to a substantially constant voltage, e.g., logic 0 (low level). Thus, the output voltage of the NOR gate 428 is driven high. Accordingly, the gate voltage of the NMOSFET 426 is driven high so as to turn on the NMOSFET 426. The turn-on resistance of the NMOSFET 426, which is relatively small, is coupled in parallel with the resistor 327 and the turn-on resistance of the NMOSFET 326. Thus, an RC time constant of the circuit that includes the resistor 327, the NMOSFETs 326 and 426, the resistors 362 and 366, and the capacitor 364 is relatively small. As such, the gate-source voltage that drives the charge switch 340 can increase relatively fast to turn on the charge switch 340.

In one embodiment, a discharge switch can be turned on relatively fast by adopting similar structures as described with regard to FIG. 4.

Figure 5:
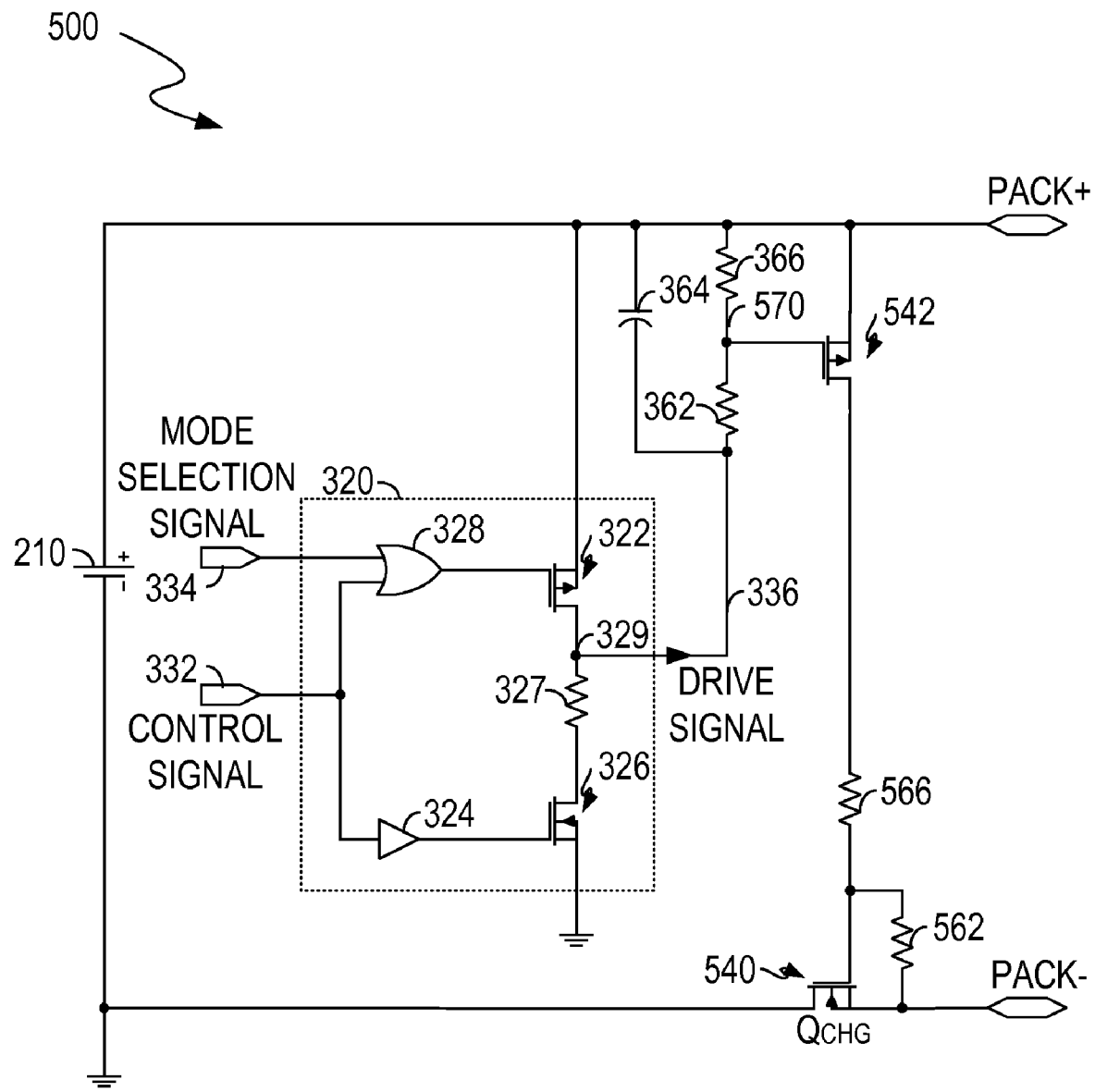
FIG. 5 shows a schematic diagram for controlling charging of a battery according to another embodiment of the present invention.

FIG. 5 shows a circuit 500 for controlling charging of a battery according to another embodiment of the present invention. Elements labeled the same as in FIG. 3 have similar functions. In the embodiment of FIG. 5, the charging circuit 500 includes a charge switch 540, a driver 320, a filter, a switch 542, and resistors 566 and 562. In one embodiment, the switch 542 is a small signal model MOSFET and the charge switch 540 is a power MOSFET.

In the example of FIG. 5, the charge switch 540 is constructed of an NMOSFET. The source and drain of the NMOSFET 540 are coupled to the terminal PACK− and the negative terminal of the battery 210, respectively. The gate of the NMOSFET 540 is coupled to a conjunction node of resistors 562 and 566.

In the example of FIG. 5, the switch 542 is constructed of a PMOSFET. The source and drain of the PMOSFET 542 are coupled to the terminal PACK+ and the charge switch 540, respectively. The gate of the switch 542 is coupled to the filter including resistors 327, 362 and 366, a capacitor 364, and a gate capacitance of the switch 542. The control signal 332 can control the switch 542 and the charge switch 540.

In the trickle charging mode, the mode selection signal 334 is set to a substantially constant voltage, e.g., logic 1 (high level), and the control signal 332 is a PWM signal, in one embodiment. Thus, the drive signal 336 is also a PWM signal. The filter can filter the drive signal 336 to provide a substantially constant DC voltage signal 570 similar to the DC voltage signal 370 in FIG. 3. In the example of FIG. 5, the DC voltage signal 570, which is across the resistor 366, has a voltage level equal to the gate-source voltage $V_{gs}$ of the switch 542. In one embodiment, the DC voltage signal 570 can drive the switch 542 in a saturation region. The current flowing through the switch 542 is determined by the duty cycle of the control signal 332. Since the current flowing through the switch 542 flows to the resistor 562, the voltage across the resistor 562, which is equal to the gate-source voltage $V_{gs}$ of the charge switch 540, is determined by the duty cycle of the control signal 332. In one embodiment, the voltage across the resistor 562 can drive the charge switch 540 in a saturation region. As such, in the trickle charging mode, the trickle charging current flowing through the charge switch 540 is determined by the duty cycle of the control signal 332.

In the normal charging mode, the control signal 332 is set to a substantially constant voltage, e.g., logic 1 (high level), and the mode selection signal 334 is set to a substantially constant voltage, e.g., logic 0 (low level), in one embodiment. In this instance, the output of the OR gate 328 is logic 1 (high level) so as to turn off the PMOSFET 322. The control signal 332, which is logic 1, passes through the buffer 324 to turn on the NMOSFET 326. Thus, the substantially constant DC voltage signal 570 across the resistor 366 is generated. In one embodiment, the DC voltage signal 570 can drive the switch 542 in the linear region. The current flowing through the switch 542 can generate a voltage drop across the resistor 562. In one embodiment, the voltage drop across the resistor 562 can drive the charge switch 540 in the linear region.

In another embodiment, the control signal 332 is a PWM signal, and the mode selection signal 334 is set to a substantially constant voltage, e.g., logic 1 (high level), in the normal charging mode. In this instance, the output of the OR gate 328 is logic 1 (high level) so as to turn off the PMOSFET 322. The control signal 332, which is the PWM signal, passes through the buffer 324 to drive the NMOSFET 326. As such, a node 329 outputs the drive signal 336 which is also a PWM signal. In one embodiment, in the normal charging mode, the drive signal 336 can directly control the switch 542 in the linear region (e.g., fully on) without going through the resistor 362 and the capacitor 364. The current flowing through the switch 542 can generate a voltage drop across the resistor 562. In one embodiment, the voltage drop across the resistor 562 can drive the charge switch 540 in the linear region.

In one embodiment, a discharge switch can be constructed of an NMOSFET and the discharging of a battery can be controlled by adopting similar structures as described with regard to FIG. 5.

Figure 6:
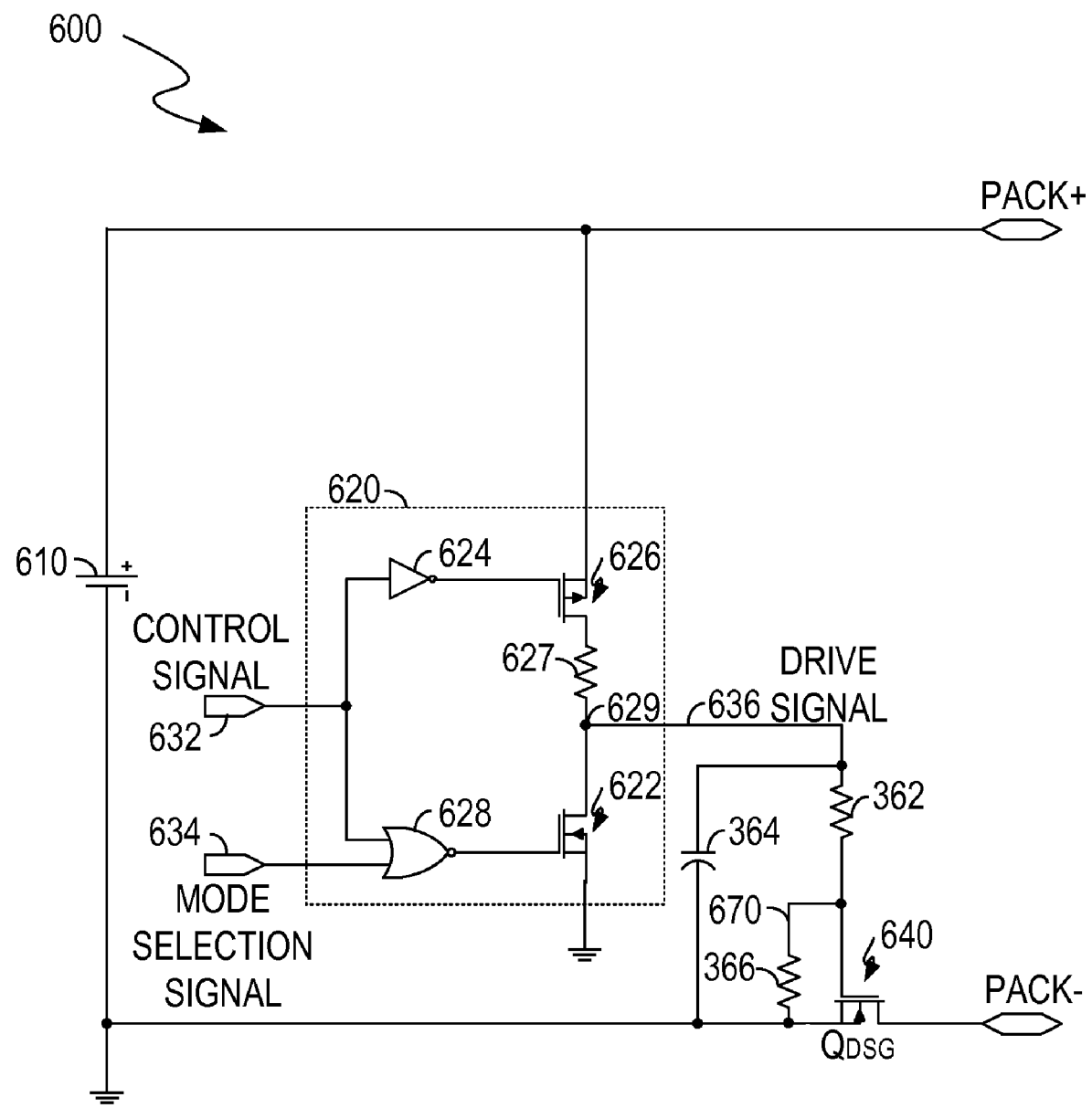
FIG. 6 shows a schematic diagram for controlling discharging of a battery according to one embodiment of the present invention.

FIG. 6 shows a circuit 600 for controlling discharging of a battery according to one embodiment of the present invention. Elements labeled the same as in FIG. 3 have similar functions. In the example of FIG. 6, the circuit 300 includes a discharge switch 640, a driver 620, and a filter. The discharge switch 640 is constructed of an NMOSFET. The drain and source of the NMOSFET 640 are coupled to the terminal PACK− and the negative terminal of a battery 610, respectively. The gate of the NMOSFET is coupled to the driver 620.

In the example of FIG. 6, the driver 620 includes an NOR gate 628, an inverter gate 624, an NMOSFET 622, a PMOSFET 626, and a resistor 627. A control signal 632 is input into the inverter gate 624 and the NOR gate 628. A mode selection signal 634 is input into the NOR gate 628. A drive signal 636 is generated by the driver 620 and output to the filter including resistors 627, 362, 366, a capacitor 364, and a gate capacitance of the discharge switch 640.

In the trickle discharging mode, the mode selection signal 634 is set to a substantially constant DC voltage, e.g., logic 1 (high level), and the control signal 632 is a PWM signal, in one embodiment. In this instance, the driver 620 outputs the drive signal 636 at a node 629 in a form of a square wave. In other words, the drive signal 636 is also a PWM signal. Furthermore, a duty cycle of the drive signal 636 is determined by a duty cycle of the control signal 632.

The filter filters the drive signal 636 which is a PWM signal to provide a substantially constant DC voltage signal 670. In the example of FIG. 6, the DC voltage signal 670 is across the resistor 366, and thus has a voltage equal to the gate-source voltage $V_{gs}$ of the discharge switch 640. In one embodiment, the DC voltage signal 670 drives the discharge switch 640 in a saturation region, where a current flowing through the discharge switch 640 is determined by the DC voltage signal 670. The DC voltage signal 670 is determined by the duty cycle of the drive signal 636, which is further determined by the duty cycle of the control signal 632. As such, in the trickle discharging mode, the trickle discharging current flowing through the discharge switch 640 is determined by the duty cycle of the control signal 632.

When the voltage of the battery 610 drops to a predetermined value as the trickle discharging proceeds, the discharge of the battery 610 can be switched to the normal discharging mode. In the normal discharging mode, the control signal 632 is set to a substantially constant voltage, e.g., logic 1 (high level), and the mode selection signal 634 is set to a substantially constant voltage, e.g., logic 0 (low level), in one embodiment. In this instance, NMOSFET 622 can be turned off and the PMOSFET 626 can be turned on. Thus, a substantially constant DC voltage signal 670 across the resistor 366 having a voltage equal to the gate-source voltage $V_{gs}$ of the discharge switch 640 can be generated. In one embodiment, the DC voltage signal 670 drives the discharge switch 640 in the linear region.

In another embodiment, the control signal 632 is a PWM signal, and the mode selection signal 634 is set to logic 1 (high level) in the normal discharging mode. In this instance, the driver 620 outputs the drive signal 636, e.g., a PWM signal, at the node 629. In one embodiment, in the normal discharging mode, the drive signal 636 can directly control the discharge switch 640 in the linear region (e.g., fully on) without going through the resistor 362 and the capacitor 364.

In one embodiment, an additional path which is similar to the path that includes the inverter gate 424, the NOR gate 428, and the NMOSFET 426 shown in FIG. 4 can be added into the driver 630 to turn on the discharge switch 640 relatively fast.

Figure 7:
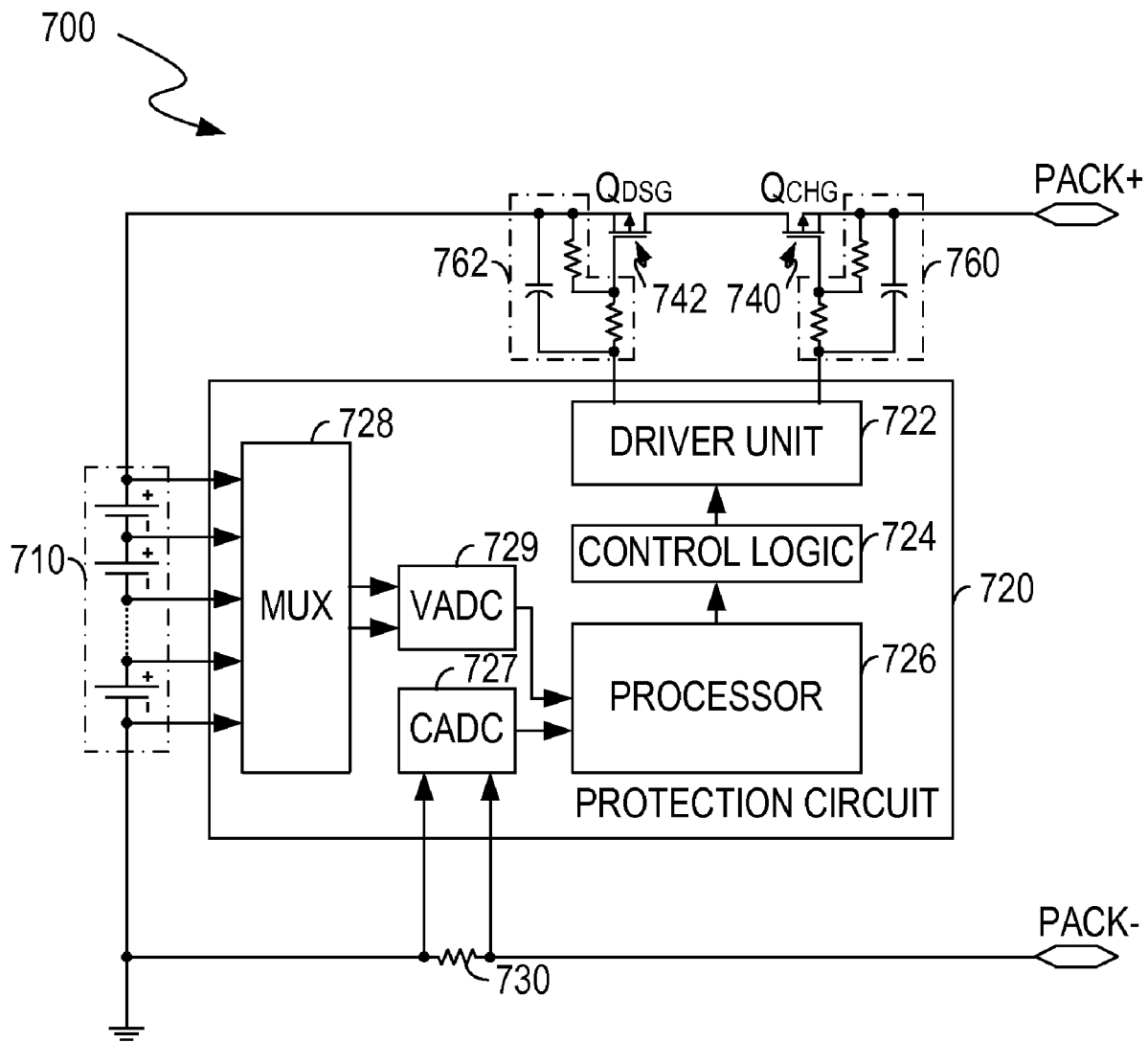
FIG. 7 shows a battery system according to one embodiment of the present invention.

FIG. 7 shows a battery system 700 according to one embodiment of the present invention. FIG. 7 is described in connection with FIG. 2, FIG. 3 and FIG. 6. In the example of FIG. 7, the battery system 700 includes a battery pack 710 having multiple cells, a charge switch 740, a discharge switch 742, a protection circuit 720, filters 760 and 762, and a resistor 730. In the example of FIG. 7, the protection circuit 720 includes a driver unit 722, a control logic 724, a processor 726, a monitoring block (e.g., a multiplexer (MUX)) 728, a voltage analog-to-digital converter (VADC) 729, and a current analog-to-digital converter (CADC) 727. The battery system 700 can be coupled to a charger or a load via the terminals PACK+ and PACK−.

The driver unit 722 in the protection circuit 720 can generate a charging control signal (e.g., the drive signal 336 in FIG. 3) to control the charge switch 740, thereby charging the battery pack 710 in the normal charging mode or the trickle charging mode as described in relation to FIG. 3. Similarly, the driver unit 722 can generate a discharging control signal (e.g., the drive signal 636 in FIG. 6) to control the discharge switch 742, thereby discharging the battery pack 710 in the normal discharging mode or the trickle discharging mode as described in relation to FIG. 6.

In one embodiment, the monitoring block 728 can output monitoring signals that indicate the statuses of the individual cells in the battery pack 710. For example, the monitoring block 728 can generate analog voltage signals indicating respective cell voltages of the individual cells in the battery pack 710 to the VADC 729. The resistor 730 can produce an analog voltage signal indicating a current flowing through the battery pack 710. The VADC 729 and the CADC 727 convert the analog signals to digital signals respectively and output the digital signals to the processor 726. The processor 726 can send commands to the control logic 724 based on the digital signals. The control logic 724 coupled to the processor 726 can generate a driver control signal (e.g., the control signal 232 in FIG. 2) and provide the driver control signal to the driver unit 722 in response to the commands. The driver unit 722 can generate charging and discharging control signals (e.g., the drive signal 336 in FIG. 3 and the drive signal 636 in FIG. 6) to drive the switches 740 and 742 respectively. The filter 760 can filter the charging control signals and provide a substantially constant DC voltage signal to control the charge switch 740 as described in relation to FIG. 3. Similarly, the filter 762 can filter the discharging control signals and provide a substantially constant DC voltage signal to control the discharge switch 742 as described in relation to FIG. 6.

In the trickle charging/discharging mode, the driver control signal generated by the control logic 724 is a PWM signal. Advantageously, the duty cycle of the PWM signal can be adjusted based on the monitoring signals to regulate the trickle charging/discharging current.

In one embodiment, the duty cycle of the PWM signal can be adjusted based on the monitored current flowing through the battery pack 710. For example, if the current monitored by the resistor 730 is greater than a predetermined current $I_{PRE}$ plus a hysteresis $I_{HYS}$, the processor 726 sends a command to the control logic 724. In response, the duty cycle of the PWM signal generated by the control logic 724 can be decreased. If the current monitored by the resistor 730 is less than a predetermined current $I_{PRE}$ minus a hysteresis $I_{HYS}$, the duty cycle of the PWM signal generated by the control logic 724 can be increased. If the current is in the range that is from $(I_{PRE}-I_{HYS})$ to $(I_{PRE}+I_{HYS})$, the duty cycle will keep unchanged, in one embodiment.

In another embodiment, the duty cycle of the PWM signal can be adjusted based on the monitored voltage across the battery pack 710. For example, if the voltage monitored by the monitoring block 728 increases, the duty cycle of the PWM signal in the trickle charging mode is increased.

Figure 8:
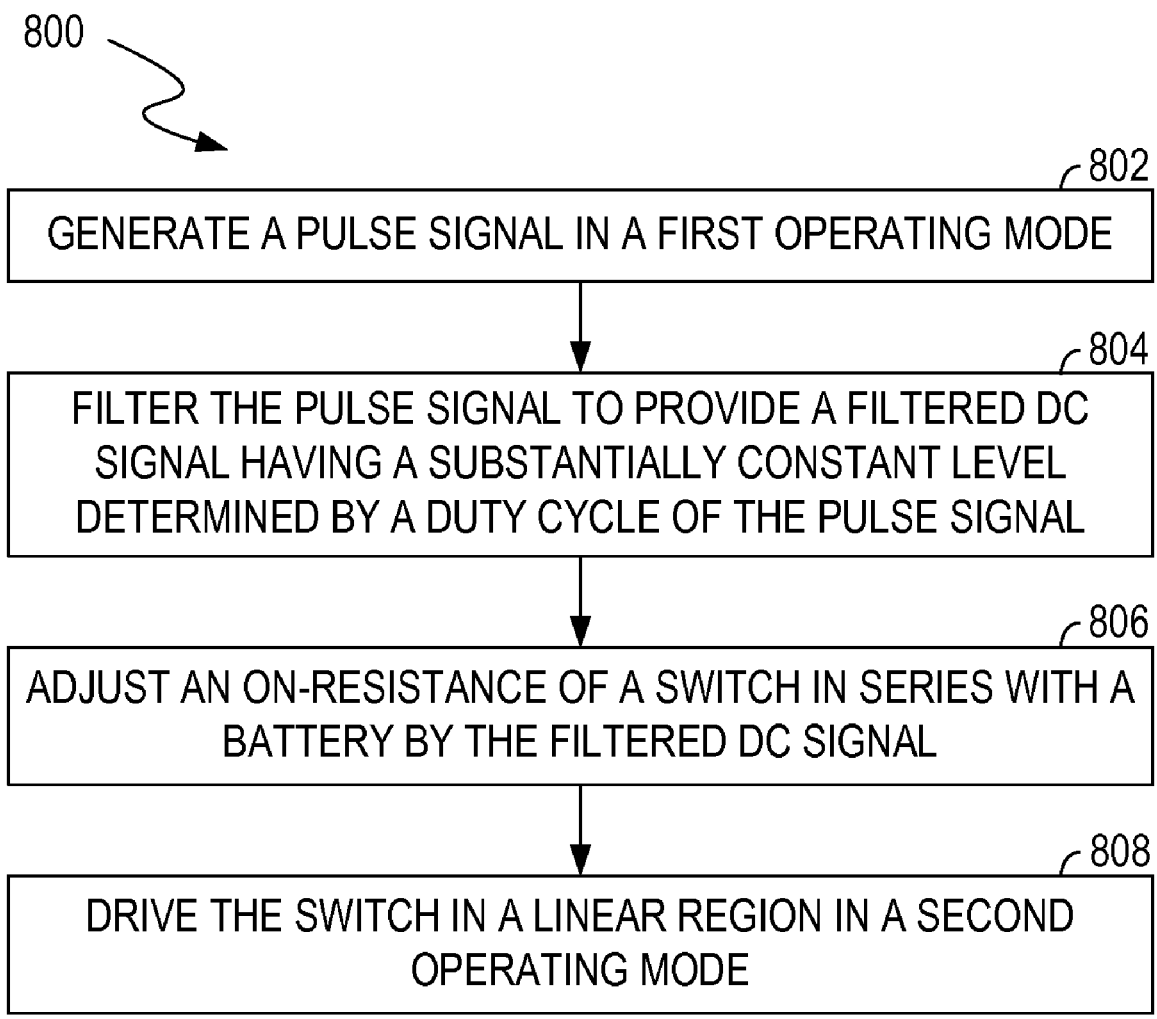
FIG. 8 shows a flowchart of a method for controlling a current flowing through a battery according to one embodiment of the present invention.

FIG. 8 shows a flowchart 800 of a method for controlling a current, e.g., a charging current or a discharging current, flowing through a battery according to one embodiment of the present invention. FIG. 8 is described in combination with FIG. 2 and FIG. 7.

At 802, a pulse signal is generated in a first operating mode, e.g., in a trickle charging or a trickle discharging mode. In one embodiment, the driver 220 can generate the pulse signal, e.g., a PWM signal, based on the control signal 332. In the first mode, the control signal 232 input into the driver 220 is a pulse signal, e.g., a PWM signal, in one embodiment. Furthermore, the duty cycle of the pulse signal, determined by the duty cycle of the control signal 232, can be adjusted based on a current of the battery or a voltage of the battery.

At 804, the pulse signal is filtered to provide a filtered DC signal. In one embodiment, the filtered DC signal has a substantially constant level which is determined by the duty cycle of the drive signal 236, which is further determined by the duty cycle of the control signal 232.

At 806, an on-resistance of a switch, e.g., switch 240, in series with the battery 210 is adjusted in the first mode. The filtered DC signal can control the gate-source voltage $V_{gs}$ of the switch 240, in one embodiment. More specifically, the filter DC signal adjusts the on-resistance of the switch 240 based on the duty cycle of the drive signal 236. Thus, the switch 240 operates in the saturation region and the current flowing through the switch 240 can be adjusted according to the duty cycle of the drive signal 236.

At 808, the switch, e.g., the switch 240, can be driven in a linear region (e.g., fully on) in a second mode, e.g., in a normal charging or a normal discharging mode. In one embodiment, the driver 220 generates a drive signal 236 based on the control signal 232. The drive signal 236 can be a substantially constant DC signal (e.g., logic 1). Alternatively, the drive signal 236 can be a pulse signal, e.g., a PWM signal. Therefore, the current flowing through the battery 210 can be controlled by controlling the switch 240 in the saturation region or the linear region. Advantageously, the trickle charging and normal charging can be controlled via the same charge switch, and the trickle discharging and normal discharging can be controlled via the same discharge switch. Thus, the cost of the circuit can be reduced.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A circuit for energy efficient controlling of a current flowing through a battery comprising a rechargeable multi-cell battery pack, said circuit comprising:

a driver operable for generating a pulse signal in a first charge and discharge operating mode and for generating a first signal in a second charge and discharge operating mode corresponding to said first operating mode, wherein said driver controls said current through said battery using said pulse signal and said first signal; and a filter coupled to said driver and operable for filtering said pulse signal to provide a filtered DC signal to adjust an on-resistance of a first switch in series with said battery based on a duty cycle of said pulse signal in said first operating mode, wherein said first switch is driven by said filtered DC signal to operate in a saturation region, and operable for receiving said first signal and for providing a second signal to drive said first switch to operate in a linear region in said second operating mode.

2. The circuit of claim 1, wherein said current in said first operating mode is less than said current in said second operating mode.

3. The circuit of claim 1, wherein said first operating mode comprises a trickle charging mode, and wherein said second operating mode comprises a normal charging mode.

4. The circuit of claim 1, wherein said first operating mode comprises a trickle discharging mode, and wherein said second operating mode comprises a normal discharging mode.

5. The circuit of claim 1, wherein said filter comprises a gate capacitance of said first switch and a resistor in series with said gate capacitance, and wherein said filtered DC signal is substantially constant.

6. The circuit of claim 1, wherein said driver receives a control signal, wherein said control signal comprises a pulse width modulation (PWM) signal in said first operating mode, and wherein said control signal comprises a substantially constant DC signal in said second operating mode.

7. The circuit of claim 1, wherein said driver receives a mode selection signal which indicates whether said circuit is in said first operating mode or said second operating mode.

8. The circuit of claim 1, wherein said driver receives a control signal, wherein said control signal comprises a first pulse width modulation (PWM) signal in said first operating mode, and wherein said control signal comprises a second PWM signal in said second operating mode.

9. The circuit of claim 1, wherein said driver comprises:
a second switch operable for receiving a control signal; and
a resistor coupled to said second switch and operable for providing said pulse signal in said first operating mode and providing said first signal in said second operating mode according to said control signal.

10. The circuit of claim 9, wherein said driver further comprises a third switch coupled to said first switch and said filter and operable for generating a turn-on resistance coupled to said filter, wherein said third switch is turned on for disabling said current flowing through said battery.

11. The circuit of claim 9, wherein said driver further comprises a third switch operable for generating a turn-on resistance coupled in parallel with said resistor and said second switch, wherein said third switch is turned on for enabling said current flowing through said battery.

12. The circuit of claim 1, wherein said duty cycle of said pulse signal is adjusted based on a status of said battery.

13. A battery system with energy efficient controlling of a current flowing through a battery comprising a rechargeable multi-cell battery pack, comprising:
a switch coupled in series with said battery; and
a circuit coupled to said battery and said switch and operable for selectively operating in a first charge and discharge operating mode and a second charge and discharge operating mode corresponding to said first operating mode to drive said switch to operate in a saturation region and a linear region respectively so as to adjust a current flowing through said battery, said circuit comprising:
a driver operable for generating a first pulse width modulation (PWM) signal in said first operating mode and for generating a first DC signal in a second operating mode; and
a filter coupled to said driver and operable for receiving said first PWM signal in said first operating mode and generating a substantially constant DC signal to drive said switch to operate in said saturation region, and operable for receiving said first DC signal in said second operating mode and generating a second substantially constant DC signal to drive said switch to operate in said linear region.

14. The system of claim 13, wherein a duty cycle of said first PWM signal is adjusted based on a status of said battery.

15. The system of claim 13, wherein said filter comprises a gate capacitance of said switch and a resistor in series with said gate capacitance.

16. The system of claim 13, wherein said driver receives a control signal, wherein said control signal comprises a second pulse width modulation (PWM) signal in said first operating mode, and wherein said control signal comprises a substantially constant second DC signal in said second operating mode.

17. The system of claim 13, wherein said driver receives a mode selection signal which indicates whether said circuit is in said first operating mode or said second operating mode.

18. The system of claim 13, wherein said driver receives a control signal, wherein said control signal comprises a second pulse width modulation (PWM) signal in said first operating mode, wherein said control signal comprises a third PWM signal in said second operating mode.

19. A method for energy efficient controlling of a current flowing through a battery comprising a rechargeable multi-cell battery pack, said method comprising:
generating at a driver a pulse signal in a first charge and discharge operating mode;
filtering at a filter said pulse signal to provide a filtered DC signal having a substantially constant level determined by a duty cycle of said pulse signal;
adjusting an on-resistance of a switch in series with said battery by said filtered DC signal in said first operating mode, wherein said filtered DC signal drives said switch to operate in a saturation region;
generating at said driver a DC signal to drive said switch to operate in a linear region in a second charge and discharge operating mode; and
filtering at said filter said DC signal to provide a second filtered DC signal in said second operating mode, wherein said second filtered DC signal drives said switch to operate in a linear region.

20. The method of claim 19, further comprising:
adjusting said duty cycle of said pulse signal based on a status of said battery, wherein said status is selected from a group consisting of: a voltage of said battery and a current of said battery.

* * * * *